US008850476B2

(12) United States Patent
VanDuyn et al.

(10) Patent No.: US 8,850,476 B2
(45) Date of Patent: Sep. 30, 2014

(54) BACKWARDS GUIDE (75) Inventors: Luke VanDuyn, Highlands Ranch, CO (US); John T. Kennedy, Denver, CO (US)

(73) Assignee: Echostar Technologies L.L.C., Engelwood, CO (US)

( * ) Notice: Subject to any disclaimer, the term of this patent is extended or adjusted under 35 U.S.C. 154(b) by 318 days.

(21) Appl. No.: 13/215,655

(22) Filed: Aug. 23, 2011

(65) Prior Publication Data
US 2013/0055310 A1 Feb. 28, 2013

(51) Int. Cl.
*H04N 5/445* (2011.01)
*H04N 21/482* (2011.01)
*H04N 21/432* (2011.01)
*H04N 21/6543* (2011.01)

(52) U.S. Cl.
CPC ....... *H04N 21/4821* (2013.01); *H04N 21/4325* (2013.01); *H04N 21/6543* (2013.01)
USPC .............................................. 725/39; 725/40

(58) Field of Classification Search
CPC ....................... H04N 21/482; H04N 21/42209
USPC .................................................. 725/38, 39, 40
See application file for complete search history.

(56) References Cited

U.S. PATENT DOCUMENTS

| | | | |
|---|---|---|---|
| 4,706,121 A | 11/1987 | Young | |
| 4,723,246 A | 2/1988 | Weldon, Jr. | |
| 4,802,215 A | 1/1989 | Mason | |
| 5,016,273 A | 5/1991 | Hoff | |
| 5,187,589 A | 2/1993 | Kono et al. | |
| 5,335,277 A | 8/1994 | Harvey et al. | |
| 5,483,277 A | 1/1996 | Granger | |
| 5,488,658 A | 1/1996 | Hirashima | |

(Continued)

FOREIGN PATENT DOCUMENTS

| EP | 0 903 743 A | 3/1999 |
|---|---|---|
| EP | 0 973 333 A | 1/2000 |

(Continued)

OTHER PUBLICATIONS

Author Unknown, "Move Networks is Delivering the Next Generation of Television," Move Networks, 2010, obtained online at http://www.movenetworks.com/, 2 pages.

(Continued)

*Primary Examiner* — Nasser Goodarzi
*Assistant Examiner* — Michael Hong
(74) *Attorney, Agent, or Firm* — Kilpatrick Townsend & Stockton LLP (57) ABSTRACT A receiver determines to transmit an EPG that includes schedule information regarding content available from a provider, determines that content is stored and is not currently available from the provider, incorporates information regarding the stored content in the EPG, and includes indicators indicating that the stored content is stored rather than available from the provider. The stored content may be recorded as part of recording a plurality of content received via a broadcast that are all included in the same frequency band and encoded with the same code word. The EPG may be divided into portions that include information regarding available content and portions that include information regarding previously available content and may include indications of which are stored. The EPG may be configured in a calendar arrangement based at least on the information regarding the available and information regarding when stored content were previously available from the provider.

20 Claims, 5 Drawing Sheets

(56) References Cited

U.S. PATENT DOCUMENTS

| | | |
|---|---|---|
| 5,541,738 A | 7/1996 | Mankovitz |
| 5,642,153 A | 6/1997 | Chaney et al. |
| 5,684,969 A | 11/1997 | Ishida |
| 5,805,763 A | 9/1998 | Lawler et al. |
| 5,974,218 A | 10/1999 | Nagasaka et al. |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,730,517 B1 | 6/2010 | Rey et al. |
| 7,739,711 B2 | 6/2010 | Finseth et al. |
| 7,804,861 B2 | 9/2010 | Kim |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,437,622 B2 | 5/2013 | Casagrande |
| 8,447,170 B2 | 5/2013 | Casagrande |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2001/0046366 A1 | 11/2001 | Susskind |
| 2002/0046407 A1 | 4/2002 | Franco |
| 2002/0054752 A1 | 5/2002 | Wood et al. |
| 2002/0055343 A1 | 5/2002 | Stetzler et al. |
| 2002/0097340 A1 | 7/2002 | Takagi et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0188943 A1 | 12/2002 | Freeman et al. |
| 2003/0110514 A1 | 6/2003 | West et al. |
| 2003/0177495 A1* | 9/2003 | Needham et al. ............... 725/55 |
| 2003/0200548 A1 | 10/2003 | Baran et al. |
| 2003/0208763 A1* | 11/2003 | McElhatten et al. ............ 725/58 |
| 2004/0001087 A1 | 1/2004 | Warmus et al. |
| 2004/0015992 A1* | 1/2004 | Hasegawa et al. ............. 725/86 |
| 2004/0015999 A1 | 1/2004 | Carlucci et al. |
| 2004/0162871 A1 | 8/2004 | Pabla et al. |
| 2004/0242150 A1 | 12/2004 | Wright et al. |
| 2004/0268387 A1 | 12/2004 | Wendling |
| 2005/0120049 A1 | 6/2005 | Kanegae et al. |
| 2005/0125683 A1 | 6/2005 | Matsuyama et al. |
| 2005/0229213 A1 | 10/2005 | Ellis et al. |
| 2005/0271365 A1 | 12/2005 | Hisatomi |
| 2006/0056800 A1 | 3/2006 | Shimagami et al. |
| 2006/0206819 A1 | 9/2006 | Tsuji et al. |
| 2006/0215993 A1 | 9/2006 | Yamada |
| 2007/0039032 A1 | 2/2007 | Goldey et al. |
| 2007/0157253 A1 | 7/2007 | Ellis et al. |
| 2007/0165855 A1 | 7/2007 | Inui |
| 2007/0204288 A1 | 8/2007 | Candelore |
| 2008/0046929 A1 | 2/2008 | Cho et al. |
| 2008/0092164 A1 | 4/2008 | Agarwal et al. |
| 2008/0141322 A1 | 6/2008 | Jang et al. |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222681 A1 | 9/2008 | Kwon |
| 2008/0271077 A1 | 10/2008 | Kim et al. |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0320183 A1 | 12/2008 | Fyock |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0142036 A1 | 6/2009 | Branam et al. |
| 2009/0165057 A1 | 6/2009 | Miller et al. |
| 2009/0178098 A1 | 7/2009 | Westbrook et al. |
| 2009/0254962 A1 | 10/2009 | Hendricks et al. |
| 2009/0260038 A1 | 10/2009 | Acton et al. |
| 2010/0020794 A1 | 1/2010 | Cholas et al. |
| 2010/0050225 A1 | 2/2010 | Bennett |
| 2010/0086277 A1 | 4/2010 | Craner |
| 2010/0100899 A1 | 4/2010 | Bradbury et al. |
| 2010/0135639 A1 | 6/2010 | Ellis et al. |
| 2010/0158479 A1 | 6/2010 | Craner |
| 2010/0158480 A1 | 6/2010 | Jung et al. |
| 2010/0169926 A1* | 7/2010 | Westberg et al. ............... 725/40 |
| 2010/0247067 A1 | 9/2010 | Gratton |
| 2010/0265391 A1* | 10/2010 | Muramatsu et al. ........ 348/441 |
| 2010/0284537 A1 | 11/2010 | Inbar |
| 2010/0313222 A1 | 12/2010 | Lee et al. |
| 2011/0007218 A1 | 1/2011 | Moran et al. |
| 2011/0030024 A1 | 2/2011 | Pasko et al. |
| 2011/0032856 A1 | 2/2011 | Ozawa |
| 2011/0043652 A1 | 2/2011 | King et al. |
| 2011/0078750 A1 | 3/2011 | Tam et al. |
| 2011/0162011 A1 | 6/2011 | Hassell et al. |
| 2011/0225616 A1 | 9/2011 | Ellis |
| 2011/0311045 A1 | 12/2011 | Candelore et al. |
| 2012/0278837 A1 | 11/2012 | Curtis et al. |
| 2012/0284765 A1 | 11/2012 | Killick et al. |
| 2012/0296745 A1 | 11/2012 | Harper et al. |
| 2012/0311634 A1 | 12/2012 | Van Duyn et al. |
| 2013/0014146 A1 | 1/2013 | Bhatia et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243395 A1 | 9/2013 | Kummer |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0298166 A1 | 11/2013 | Herrington et al. |

FOREIGN PATENT DOCUMENTS

| | | |
|---|---|---|
| EP | 1 168 347 A | 1/2002 |
| EP | 1372339 A2 | 12/2003 |
| EP | 2 018 059 A1 | 1/2009 |
| EP | 1 667 452 B1 | 11/2011 |
| WO | 2004/057610 A1 | 7/2004 |
| WO | 2008/010689 A1 | 1/2008 |
| WO | 2008/060486 A2 | 5/2008 |
| WO | 2011/027236 A1 | 3/2011 |
| WO | 2013/138638 A1 | 9/2013 |
| WO | 2013/138689 A1 | 9/2013 |
| WO | 2013/138740 A1 | 9/2013 |

(56) References Cited

FOREIGN PATENT DOCUMENTS

OTHER PUBLICATIONS

International Search Report and Written Opinion of PCT/US2012/052011 mailed Dec. 17, 2012, 44 pages.
Jung, J., et al., "Design and Implementation of a Multi-Stream CableCARD with a High-Speed DVB-Common Descrambler," ACM Multimedia, 2006, 4 pages.
U.S. Appl. No. 13/286,157, filed Oct. 31, 2011, Non-Final Office Action mailed Jan. 17, 2013, 20 pages.
U.S. Appl. No. 13/215,702, filed Aug. 23, 2011, Notice of Allowance mailed Feb. 11, 2013, 13 pages.
U.S. Appl. No. 13/324,831, filed Dec. 13, 2011 Non-Final Office Action mailed Feb. 28, 2013, 23 pages.
U.S. Appl. No. 13/292,047, filed Nov. 8, 2011 Non-Final Office Action mailed Jan. 18, 2013, 17 pages.
U.S. Appl. No. 13/614,899, filed Sep. 13, 2012 Non-Final Office Action mailed Feb. 5, 2013, 17 pages.
U.S. Appl. No. 13/291,014, filed Nov. 7, 2011 Non-Final Office Action mailed Mar. 29, 2013, 21 pages.
U.S. Appl. No. 13/302,852, filed Nov. 22, 2011, Non-Final Rejection mailed May 23, 2013, 19 pages.
International Search Report and Written Opinion of PCT/US2012/51992 mailed Nov. 2, 2012, 15 pages.
Interantional Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
U.S. Appl. No. 13/149,852, filed May 31, 2011, Non-Final Office Action mailed Dec. 12, 2012, 9 pages.
U.S. Appl. No. 13/215,916, filed Aug. 23, 2011 Notice of Allowance mailed Jan. 4, 2013.
U.S. Appl. No. 13/288,002, filed Nov. 2, 2011, Non-final Office Action mailed Sep. 26, 2013, 15 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Sep. 17, 2013, 17 pages.
U.S. Appl. No. 13/291,014, filed Nov. 7, 2011 Notice of Allowance mailed Aug. 7, 2013, 16 pages.
U.S. Appl. No. 13/215,598, filed Aug. 23, 2011 Non-Final Office Action mailed Jun. 20, 2013, 15 pages.
U.S. Appl. No. 13/294,005, filed Nov. 11, 2011 Non-Final Office Action mailed Aug. 14, 2013, 32 pages.
U.S. Appl. No. 13/592,976, filed Aug. 23, 2012 Notice of Allowance mailed Oct. 7, 2013, 18 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011 Non-Final Office Action mailed Jul. 25, 2013, 49 pages.
U.S. Appl. No. 13/286,157, filed Oct. 31, 2011 Notice of Allowance mailed Feb. 3, 2014, 81 pages.
U.S. Appl. No. 13/302,852, filed Nov. 22, 2011, Final Rejection mailed Dec. 9, 2013, 23 pages.
U.S. Appl. No. 13/215,598, filed Aug. 23, 2011 Final Office Action mailed Nov. 21, 2013, 23 pages.
U.S. Appl. No. 13/215,598, filed Aug. 23, 2011 Non-Final Office Action mailed Feb. 6, 2014, 12 pages.
U.S. Appl. No. 13/294,005, filed Nov. 11, 2011 Final Office Action mailed Jan. 3, 2014, 29 pages.
U.S. Appl. No. 13/829,350, filed Mar. 14, 2013, Non Final Office Action mailed Feb. 28, 2014, 29 pages.
U.S. Appl. No. 13/799,719, filed Mar. 13, 2013, Non Final Office action mailed Oct. 25, 2013, 79 pages.
International Search Report of PCT/KR2007/003521 mailed on Oct. 23, 2007, 22 pages.
International Search Report of PCT/IB2003/005737 mailed on Mar. 3, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013, 7 pages.
U.S. Appl. No. 13/791,636, filed Mar. 8, 2013, Non Final Office Action mailed Nov. 22, 2013, 19 pages.

* cited by examiner

| | | STRIKEOUT | | | | THURSDAY, 3/3 7:11PM |
|---|---|---|---|---|---|---|
| | | NOT RESPONSIBLE EPISODE 43 PG-13, TV-PG - SERIES/SPECIAL. REALITY SHOW WHERE CONTESTANTS FIGHT IT OUT TO SEE WHO WINS THE ULTIMATE PRIZE...(CC) | | | | |

PROGRAM GUIDE ⟵ MY HD CHANNELS →

| | THURSDAY, 3/3 | 7:00 PM | 7:30 PM | 8:00 PM | 8:30 PM | 9:00 PM | 9:30 PM |
|---|---|---|---|---|---|---|---|
| BOX HD | 031-00 HTYP | MECHANICS 101 | | DESIGNING THE INTERIORS | | NEWS HOUR | |
| U TV | 020-00 ZEQM | HONK | | HONK | | NEWS FIRST | TONIGHT'S NEWS |
| ALM HDTV | 009-00 TULA | DORMS | COUPLES | THE STORAGE | OUTDOOR ADVENTURES | HISTORY OF ROCKS | HISTORY OF ROCKS |
| XYZ HD | 007-00 IWAK | STRIKEOUT | THINK TANK | POST TIME: WHAT HAPPENED? | 30 MIN NEWS | 10/15 | |
| KBT | 006-00 PINA | WEEKLY | RULES | GROUP LINE | | THE STATES HISTORY SHOW | |
| ECB | 004-00 KNQP | THEORY | | THE POLICE | | THE BRAINIAC | |
| GS HD | 002-00 JINQ | NEWS SHOW | | SECRET VILLAGE | | NATURAL TALENTS | |

FIG. 4A

| | | THINK TANK<br>EPISODE 4<br>PG-13, TV-PG - SERIES/SPECIAL. THE ULTIMATE IDEA REALITY TV SHOW WHERE CONTESTANTS SHOW OFF THEIR BRILLIANT INVENTIONS...(CC) | | THURSDAY, 3/3<br>7:11PM |
|---|---|---|---|---|

| PROGRAM GUIDE | | | | ⇐ MY HD CHANNELS ⇨ | |
|---|---|---|---|---|---|
| PRIMETIME ANYTIME | | 7:00 PM | 7:30 PM | 8:00 PM | 8:30 PM |
| MECHANICS 101 | BOX HD  031-00 HTYP | MECHANICS 101 | | DESIGNING THE INTERIORS | |
| | U_TV  020-00 ZEQM | HONK | | HONK | |
| THE POLICE | ALM HDTV  009-00 TULA | DORMS | COUPLES | THE STORAGE | OUTDOOR ADVENTURES |
| WEEKLY / THINK TANK | XYZ HD  007-00 IWAK | STRIKEOUT | | POST TIME: WHAT HAPPENED? | |
| | Q KBT  006-00 PINA | WEEKLY | THINK TANK | GROUP LINE | 30 MIN NEWS |
| THE CRIMINALS IDEA | ECB  004-00 KNQP | THEORY | RULES | THE POLICE | |
| | GS HD  002-00 JINQ | NEWS SHOW | | SECRET VILLAGE | |

FIG. 4B

BACKWARDS GUIDE

FIELD OF THE INVENTION

The present disclosure relates to electronic programming guides and, more particularly, to electronic programming guides that present information for instances of content that have been recorded.

SUMMARY

The present disclosure relates to methods, systems, and apparatuses for displaying electronic programming guides that include stored content information. A content receiver may determine to transmit an electronic programming guide that includes schedule information regarding instances of content available from a content provider. The content receiver may determine that at least one instance of content is stored by the content receiver and is not currently available from the content provider. The content receiver may incorporate information regarding the stored instance of content in the electronic programming guide and may include an indicator indicating that the stored instance of content is stored rather than available from the content provider (which may be included when a slot corresponding to the stored instance of content is selected). In some cases, the stored instance of content may be recorded as part of recording a plurality of instances of content received via a broadcast from the content provider that are all included in the same frequency band of the broadcast and are all encoded utilizing the same code word.

In some implementations, the electronic programming guide may be divided into a portion that includes schedule information regarding the instance of content available from the content provider and a portion that includes schedule information regarding instances of content that were previously available from the content provider. In such implementations, the content receiver may include indicators in the electronic programming guide that indicate which of the previously available instances of content are stored by the content receiver. In some cases, previously available instances of content may be presented on one side of a set of channel indicators whereas currently available instances of content may be presented on the other side of the set of channel indictors.

In various implementations, the content receiver may configure the electronic programming guide in a calendar arrangement based at least on the schedule information regarding the available instances of content and schedule information regarding when stored instances of content were previously available from the content provider. In such implementations, the calendar arrangement may include a number of virtual pages that may be navigable by a user (such as navigable in one or more chronological orders).

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, and so on) generally receive content from one or more programming sources (e.g., satellite television programming providers, cable television programming providers, Internet service providers, video on demand providers, pay-per-view movie providers) via one of more communication connections (such as satellite communication connections, coaxial cable communication connections, Internet communication connections, radio-frequency connections, and so on). Such content receivers may transmit such received content to one or more presentation devices and/or store the received content for later presentation.

In order to enable users to better comprehend and select among content that is available, content receivers may provide one or more electronic programming guides (EPGs) that detail content available from content providers and the schedule of such content. Such EPGs may be provided based at least in part on information provided by the content providers regarding available content and/or content schedules. Content receivers may also provide one or more menus that detail content stored on the content receiver. By utilizing such EPGs and/or stored content menus, users may be able to discover content that is available and access such content.

Typically, content receivers present EPGs and stored content menus separately. As such, users cannot browse among content that has yet to occur at the same time that they browse stored content. In order to browse both types of content, users may have to switch repeatedly between an EPG and a stored content menu, possibly confusing users and rendering the process of selecting content burdensome. Consequently, users may not fully utilize the full scope of features provided by content receivers. Therefore, systems and method that accommodate browsing of content that has yet to occur as well as browsing of stored content, utilizing the same interface, may be desirable.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
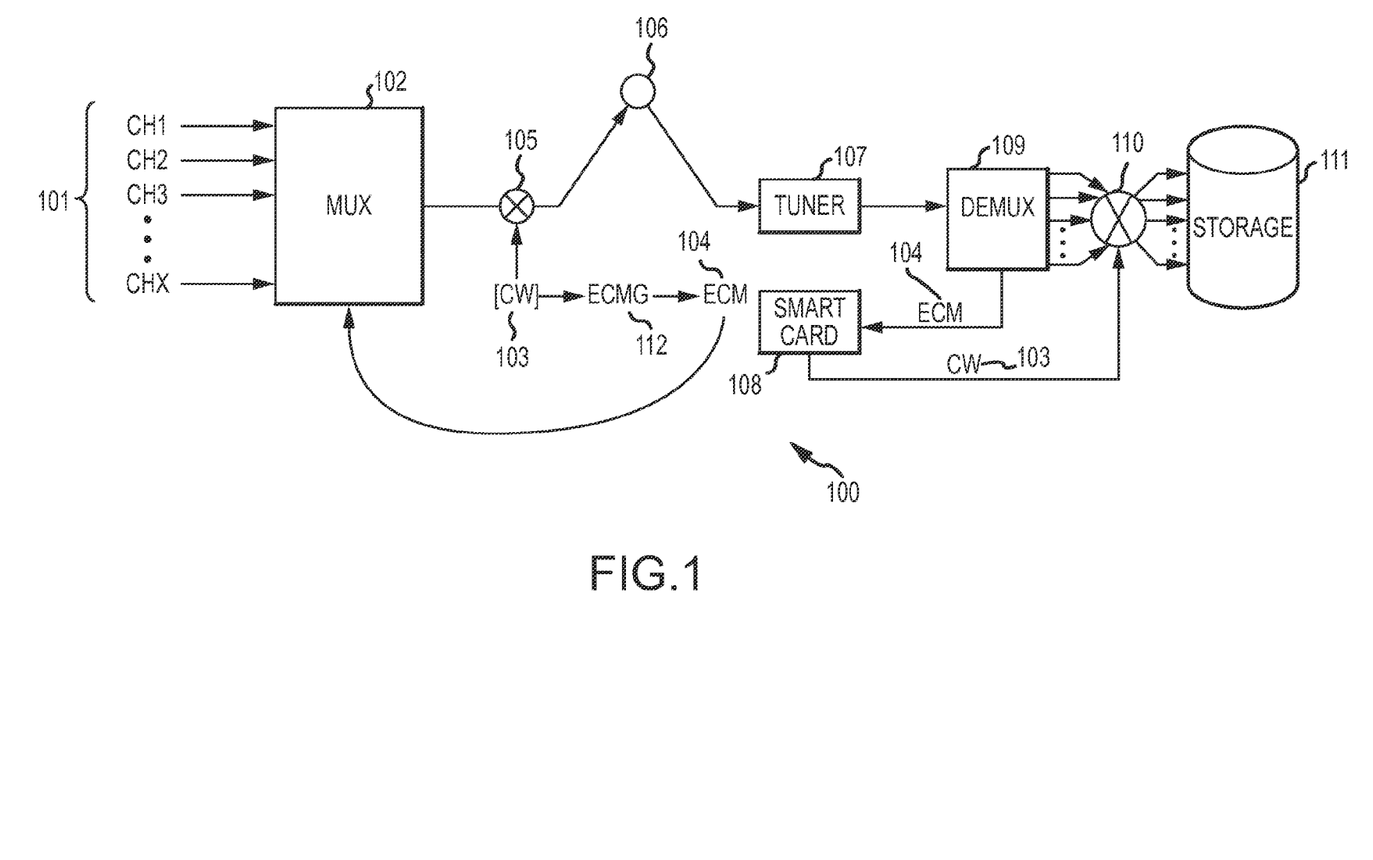
FIG. 1 is a block diagram illustrating a system for automatically recording multiple instances of content from one or more programming providers.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the programs may include multiple PIDs (packet identifiers), such as a video PID and one or more audio PIDs for a particular instance of content. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels, such as by utilizing a PID filter to keep data identified by PIDs related to the particular programming channel and discard data identified by PIDs not related to that particular programming channel. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "prime-time events" associated with all channels defined as "prime-time television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM by an ECM generator 112 which may take the CW as an input (and may also include other information such as access criteria) and outputs the ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency (which may be filtered by a PID filter, not shown) may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the CW prior to multiplexing. In another example, in some implementations, the data received via the tuned frequency may be demultiplexed before being individually descrambled utilizing the CW.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file).

Figure 2:
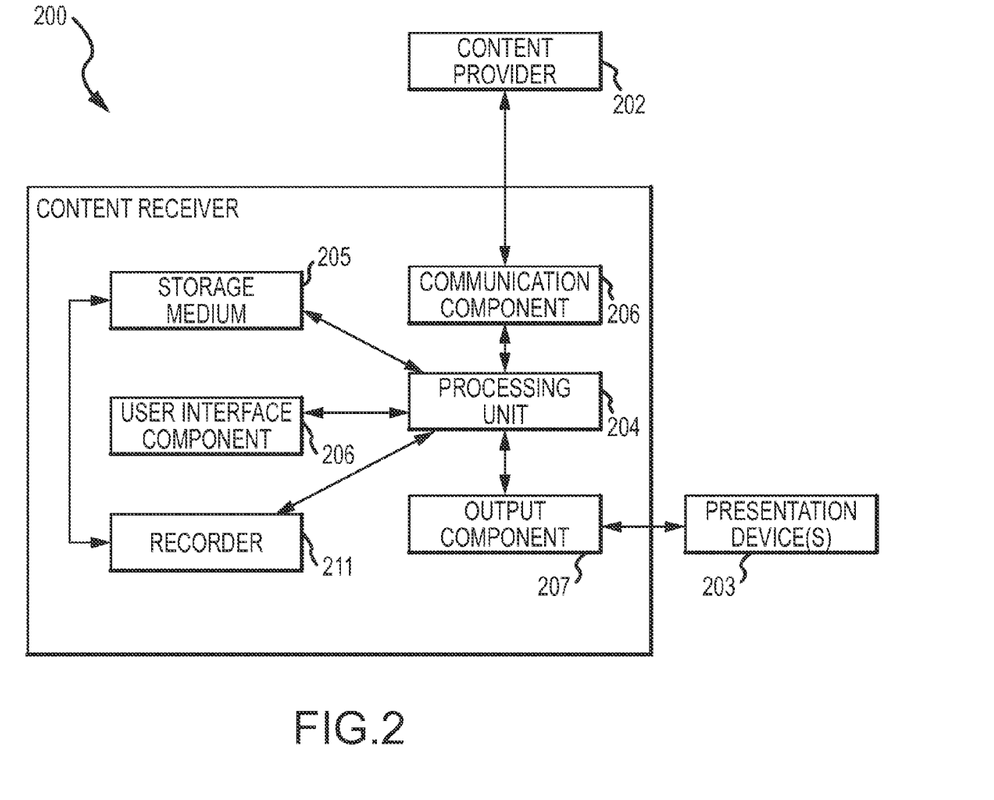
FIG. 2 is a block diagram illustrating a system a system for providing electronic programming guides that included stored content information.

FIG. 2 is a block diagram illustrating a system 200 for providing electronic programming guides that include stored content information. The system 200 includes a content receiver 201 which may be a set top box, a television receiver, a digital video recorder, a digital music player, a desktop computer, a laptop computer, a tablet computer, a mobile computer, a cellular telephone, a smart phone, and/or any other electronic device that is able to receive and/or provide received content. The system 200 may also include one or more content providers 202 (such as one or more satellite television programming providers, cable television programming providers, Internet service providers, video on demand providers, pay-per-view movie providers, and/or other entities that are configured to transmit instances of content to the content receiver) and/or one or more presentation devices 203

(such as one or more cathode ray tube displays, computer monitors, liquid crystal displays, televisions, speakers, and/or other devices configured to present instances of content transmitted by the content receiver).

The content receiver 201 may include one or more processing units 204 (which may perform functions and/or include components [not shown] that perform functions corresponding to the smart card 108, the descrambler 110, and/or the demultiplexer 109 of FIG. 1), one or more non-transitory storage media 205, one or more communication components 206 (which may include, but is not limited to, the tuner 107 of FIG. 1), one or more output components 207, one or more user interface components 208, and one or more recorders 211.

The content receiver 201 may include or be associated with a recorder 211, such as a digital video recorder. The recorder 211 may be operated by the processing unit 204 to record particular instances of content, such as television programming. When the particular instance occurs, the recorder 211 may record the instance. The recorded content instance may be stored in a database accessible to the processing unit 204, such that it is available for later viewing by a user. In addition to this functionality, the recorder 211 may buffer a certain amount of content during a live transmission. Buffering a live transmission allows a user to pause and/or rewind the content of the transmission and to then display the content in a non-live or delayed manner. In some embodiments, the recorder 211 may record the multiple instances of content 101 as illustrated in FIG. 1 and described above. The recorder 211 may automatically record the multiple instances of content 101 in response to receiving instructions to record the multiple instances of content 101 from the content provider 202. In various other implementations, the recorder 211 may record instances of content in response to user input received via the user interface component 208 (e.g., broadcast content, video on demand content, pay-per-view content, and the like). While the present disclosure is described with respect to embodiments in which the recorder 211 is provided as a component of the content receiver 201, the recorder 211 may be provided as a stand alone device in communication with the content receiver 201, which has its own processing unit, memory, processing logic, etc.

The processing unit 204 may execute instructions stored in the non-transitory storage medium 205 to receive one or more instances of content, information regarding the one or more instances of content (e.g., metadata), and/or instructions to record such instances of content (e.g., utilizing the recorder 211) from the content provider 202 via one or more communication links (such as one or more satellite communication connections, coaxial cable communication connections, Internet communication connections, radio-frequency connections, and/or other communication links) utilizing the communication component and/or store such content in the non-transitory storage medium (which may be at the direction of one or more instructions received from the content provider that specify to record received instances of content).

The processing unit 204 may also execute instructions stored in the non-transitory storage medium 205 to transmit instances of content received from the content provider 202 and/or stored in the non-transitory storage medium to the presentation device 203 utilizing the output component 207. In one or more cases, the processing unit 204 may execute the instructions described above in response to one or more user instructions received from one or more user input/output devices (not shown) (such as one or more remote control devices, touch screens, buttons, keyboards, and/or other input/output devices) via the user interface component 208.

Additionally, the processing unit 204 may execute instructions stored in the non-transitory storage medium 205 to transmit one or more EPGs to the presentation device 203 via the output component 207 (which may be performed in response to one or more user instructions received via the user interface component 208). The EPG may include schedule information for one or more instances of content accessible by the content receiver 201 from the content provider 202. Additionally, or alternatively, the EPG may include information for one or more instances of content that have previously occurred. For example, the EPG may include information for one or more instances of content that have previously occurred and been recorded by the recorder 211 and, thus, available for viewing by a user. That is, in some embodiments, the EPG may include schedule information for instances of content that have yet to occur as well instances of content that have been recorded.

In illustrative embodiments, the instances of content may be provided in the EPG as slots in a grid arranged by time associated with the respective instances of content and source (e.g., programming channel) associated with the respective instances of content. Alternatively, or additionally, the EPG may be in the form of a calendar (e.g., 5-day, 7-day, month), date book, day planner, or any other calendar-like display, and the schedule information for the instances of content may be provided as entries in the calendar-like display at the day/time at which they occurred or will occur. In one embodiment, the calendar-like display may include a virtual page turning functionality that facilitates user navigation through the pages that make up the display.

In some cases, the EPG may include one or more additional information fields that may present additional information regarding an instance of content (such as a program description and other program information for a television program) when user selection of a slot corresponding the instance of content is received via the user interface component 208. In some implementations the additional information may include a preview (such as a video, still image, slideshow and/or audio preview) of the instance of content that is provided based on processing the stored instance of content.

Figure 3:
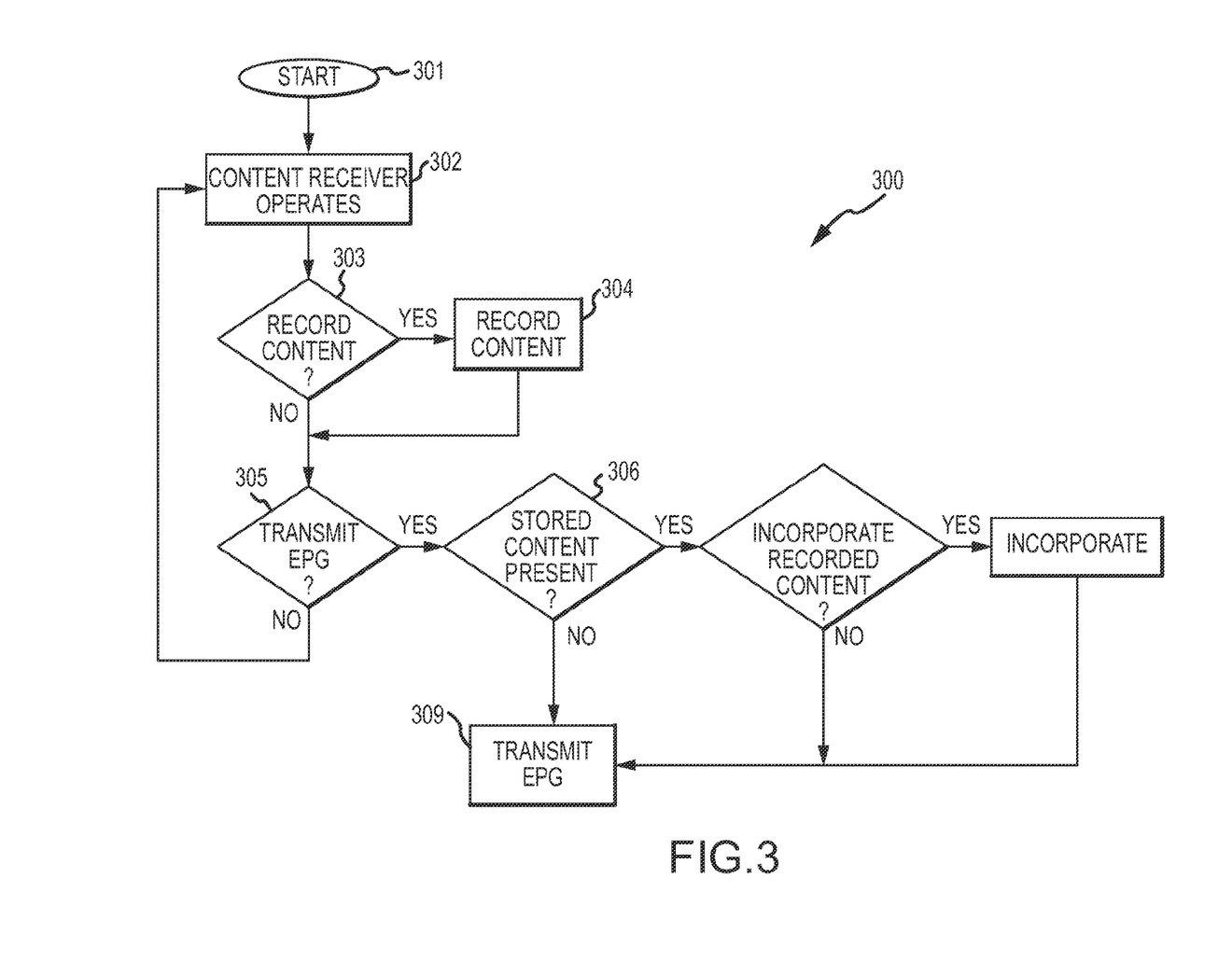
FIG. 3 is a flow chart illustrating a method for displaying electronic programming guides that included stored content information. This method may be performed by the system of FIG. 2.

FIG. 3 illustrates a method 300 for providing electronic programming guides that include schedule information for instances of content that have yet to occur as well instances of content that have occurred and been recorded. The method 300 may be performed by the content receiver 201 of FIG. 2. The flow begins at block 301 and proceeds to block 302 where the content receiver 201 operates. The flow then proceeds to block 303 where the processing unit 204 determines whether or not to record one or more instances of content received from the programming provider 202. The processing unit may determine to record an instance of content if such has been specified by a user, by an instruction received from the content provider (such as illustrated in FIG. 1 and described above), and/or otherwise specified. If so, the flow proceeds to block 304 where the processing unit records the specified instance of content in the non-transitory storage medium 205 before the flow proceeds to block 305. Otherwise, the flow proceeds directly to block 305.

At block 305, the processing unit 204 determines whether or not to transmit an EPG to the presentation device 203. The processing unit 204 may determine to transmit an EPG to the presentation device in response to a user request for an EPG received via the user interface component 208. If so, the flow proceeds to block 306. Otherwise, the flow proceeds to block 301.

At block 306, after the processing unit 204 determines whether to transmit an EPG, the processing unit determines whether or not recorded content is stored in the non-transitory storage medium 205. If not, the flow proceeds to block 309 where the processing unit transmits an EPG to the presentation device 203. Otherwise, the flow proceeds to block 307.

At block 307, after the processing unit 204 determines that recorded content is stored in the non-transitory storage medium 205, the processing unit determines whether or not to incorporate schedule information for the recorded content into the EPG. The processing unit may determine to incorporate schedule information for the recorded content in the EPG based at least in part on one or more EPG configuration settings stored in the non-transitory storage medium. If the processing unit determines to incorporate schedule information for the recorded content in the EPG, the flow proceeds to block 308 where the processing unit incorporates the content information in the EPG before the flow proceeds to block 309. Otherwise, the flow proceeds directly to block 309. Following the step of block 309, the flow proceeds to block 311 and ends.

Figure 4A:
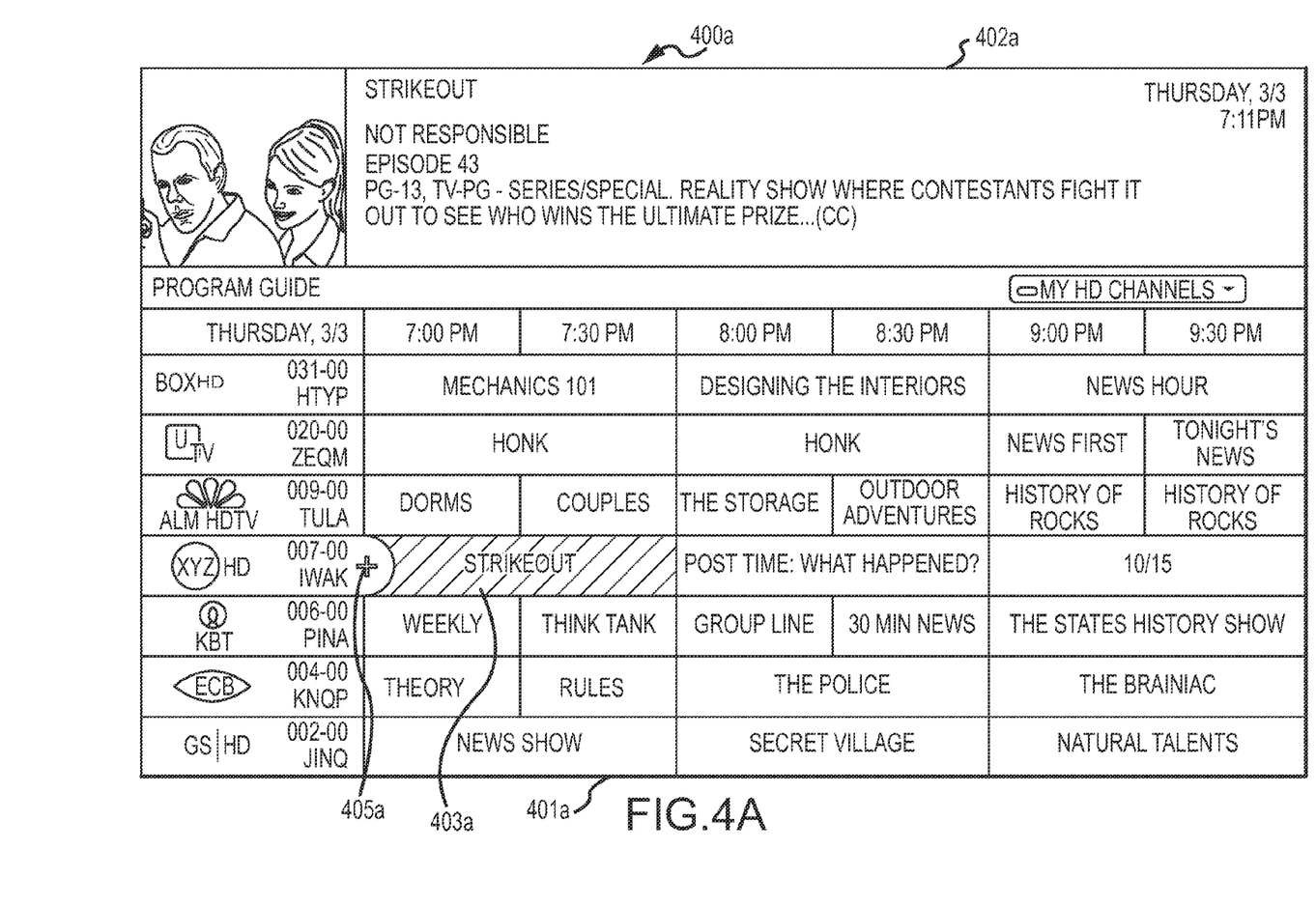
FIGS. 4A-4B are diagrams illustrating an example electronic programming guide which may be provided by the systems of FIGS. 1 and 2.
Figure 4B:
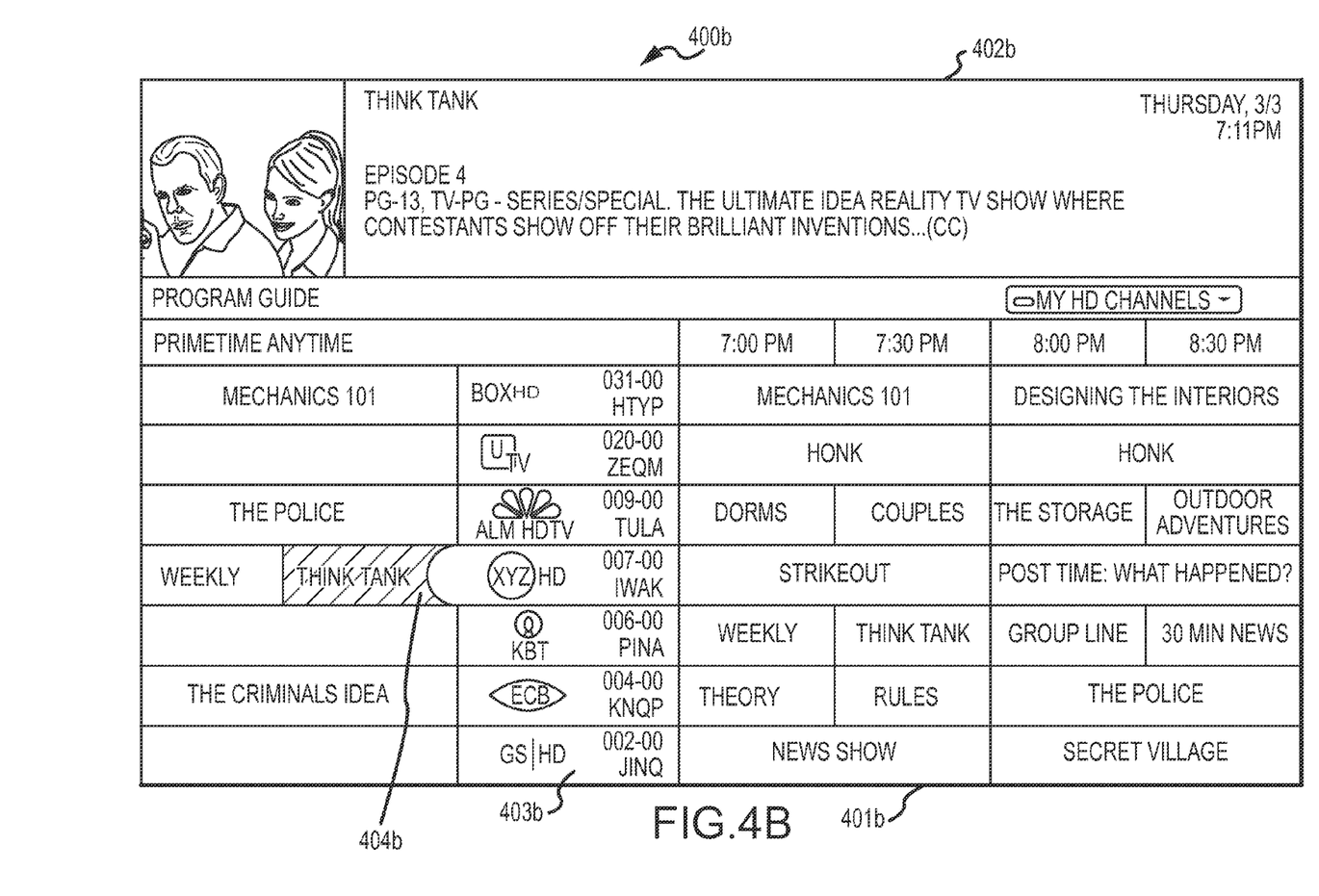

FIGS. 4A-4B illustrate an example EPG 400a-400b. The example EPG may be provided by the system 200 of FIG. 2. In this example, a content receiver may be instructed to automatically record content as illustrated in FIG. 1 and described above. In accordance with FIG. 1 and the associated description above, the content receiver may be instructed to automatically record at least the television programming associated with the major four television networks that is broadcast between the hours of seven PM and ten PM. The content receiver may also provide the EPG 400a illustrated in FIG. 4A. As illustrated, the EPG includes a grid 401a made up of a number of slots that each correspond to a television program and are arranged by an associated channel and an associated broadcast time. Also as illustrated, the EPG includes a description field 402a where additional information related to a selected slot 403A is displayed.

In FIG. 4A, schedule information related to recorded television programs stored by the content receiver is not visible. However, as illustrated in FIG. 4A, if a slot 404a corresponding to a particular program channel is selected, the content receiver incorporates an indicator 405a into the EPG that serves as notification to users that instances of content that previously occurred on that particular channel have been recorded and are available for viewing. In one embodiment, the EPG may incorporate indicators 405a with respect to each channel for which previously recorded content is available, irrespective of whether that channel is currently selected.

As illustrated in FIG. 4B, the EPG may be configured such that a user can navigate through the EPG in a direction that corresponds to backwards in time (to the left of channel column 403b in FIG. 4B). In FIG. 4B, a slot 404b, which corresponds to a program that occurred and was recorded in the past, is selected, and the description field 402b includes additional information related to slot 404b. While FIG. 4B depicts only schedule information with respect to previously recorded programs in the grid to the left of the channel column 403b, in some embodiments, schedule information for any or all of the programs that previously occurred may be included in that portion of the grid. In such an embodiment, programs that have been previously recorded may be identified in the grid by color, hatching, shadowing, or the like. In further embodiments, only instances of content that were automatically recorded as described with respect to FIG. 1 above may be provided to the left of the channel column 403b.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and/or other suitable storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for displaying an electronic programming guide that includes stored content information, the method comprising:

determining, by a content receiver, to transmit the electronic programming guide that includes schedule information regarding a plurality of instances of content available via the content receiver from at least one content provider to a presentation device, wherein
the electronic programming guide includes a grid, the grid including a plurality of time columns and a plurality of channel rows;

receiving, by the content receiver, a direction command that is indicative of moving earlier in time than an earliest time column of the plurality of time columns and is indicative of moving earlier in time than a time column of the plurality of time columns indicative of currently broadcast content;

determining, by the content receiver, that at least one instance of content is stored by the content receiver; and in response to receiving the direction command, incorporating, by the content receiver, information regarding the at least one instance of content stored by the content receiver in the electronic programming guide in at least one channel row of the plurality of channel rows, such that an indication of the at least one instance of content appears to the left of the time column indicative of the currently broadcast content.

2. The method of claim 1, wherein the at least one instance of content stored by the content receiver is recorded by the content receiver as part of recording a plurality of instances of content received via at least one broadcast from the at least one content provider wherein the plurality of instances of content are all included in a same frequency band of the at least one broadcast and are all encoded utilizing a same code word.

3. The method of claim 1, further comprising:
dividing the electronic programming guide into at least a first portion that includes the schedule information regarding the plurality of instances of content available via the content receiver from the at least one content provider and a second portion that includes information regarding a plurality of instances of content that were previously available from the at least one content provider.

4. The method of claim 1, wherein the electronic programming guide is configured in a calendar arrangement based at least on the schedule information regarding a plurality of instances of content available via the content receiver from at least one content provider and schedule information regarding when the at least one instance of content stored by the content receiver was available from the at least one content provider prior to storage.

5. The method of claim 1, the method further comprising:
including, by the content receiver, an indicator in the electronic programming guide that indicates that the at least one instance of content stored by the content receiver is stored content, wherein the indicator comprises coloring of a slot associated with the at least one instance of content.

6. The method of claim 1, the method further comprising:
incorporating, by the content receiver, at least one preview of the at least one instance of content stored by the content receiver, wherein the at least one preview generated by processing the at least one instance of content stored by the at least one content receiver.

7. The method of claim 3, further comprising:
including at least one indication that indicates that at least one of the plurality of instances of content that were previously available from the at least one content provider is stored.

8. The method of claim 7, wherein the indicated at least one plurality of instances of content that were previously available from the at least one content provider comprises the at least one instance of content stored by the content receiver.

9. The method of claim 4, wherein the calendar arrangement includes a plurality of virtual pages that are navigable by a user.

10. The method of claim 9, wherein the plurality of virtual pages are navigable by the user in a chronological order.

11. A content receiver, comprising:
at least one communication component that is configured to obtain a plurality of instances of content available from at least one content provider;
at least one non-transitory storage medium that stores at least one instance of content that is not currently available from the at least one content provider via the at least one communication component; and
at least one processing unit, communicably coupled to the at least one communication component and the at least one non-transitory storage medium, that determines to transmit an electronic programming guide that includes schedule information regarding the plurality of instances of content available from the at least one content provider via the at least one communication component to a presentation device, wherein:
the electronic programming guide includes a grid, the grid including a plurality of time columns and a plurality of channel rows; and
the at least one processing unit being configured to:
process a received direction command that is indicative of moving earlier in time than an earliest time column of the plurality of time columns and is indicative of moving earlier in time than a time column of the plurality of time columns indicative of currently broadcast content;
determine that the at least one instance of content is stored in the at least one non-transitory storage medium; and
in response to receiving the direction command, incorporate information regarding the at least one instance of content that is stored in the at least one non-transitory storage medium into the electronic programming guide, such that an indication of the at least one instance of content appears to the left of the time column indicative of the currently broadcast content.

12. The content receiver of claim 11, further comprising:
at least one recorder, communicably coupled to the at least one processing unit, that records the at least one instance of content to the at least one non-transitory storage medium as part of recording a plurality of instances of content received by the at least one communication component via at least one broadcast from the at least one content provider wherein the plurality of instances of content are all included in a same frequency band of the broadcast and are all encoded utilizing a same code word.

13. The content receiver of claim 11, wherein:
the electronic programming guide is configured in a calendar arrangement based at least on the schedule information regarding the plurality of instances of content available from at least one content provider and schedule information regarding when the at least one instance of content stored in the non-transitory storage medium was available from the at least one content provider prior to storage.

14. The content receiver of claim 11, wherein the at least one processing unit is further configured to:
include an indicator in the electronic programming guide that indicates that the at least one instance of content stored by the content receiver is stored content, wherein the indicator comprises coloring of a slot associated with the at least one instance of content.

15. The content receiver of claim 11, wherein the at least one processing unit is further configured to divide the electronic programming guide into at least a first portion that includes the schedule information regarding the plurality of instances of content available from the at least one content provider and a second portion that includes information regarding a plurality of instances of content that were previously available from the at least one content provider.

16. The content receiver of claim 11, wherein the at least one processing unit is further configured to incorporate at least one preview of the at least one instance of content stored in the at least one non-transitory storage medium in the electronic programming guide wherein the at least one processing unit generates the at least one preview by processing the at least one instance of content stored in the at least one non-transitory storage medium.

17. The content receiver of claim 13, wherein the calendar arrangement includes a plurality of virtual pages that are navigable by a user.

18. The content receiver of claim 17, wherein the plurality of virtual pages are navigable by the user in a chronological order.

19. The content receiver of claim 15, wherein the at least one processing unit is further configured to include at least one indication in the at least one electronic programming guide that indicates that at least one of the plurality of instances of content that were previously available from the at least one content provider is stored in the at least one non-transitory storage medium.

20. The content receiver of claim 19, wherein the indicated at least one plurality of instances of content that were previously available from the at least one content provider comprises the at least one instance of content stored in the at least one non-transitory storage medium.

\* \* \* \* \*